United States Patent [19]

Stapleton

[11] Patent Number: 4,768,691
[45] Date of Patent: Sep. 6, 1988

[54] ADJUSTABLE SUPPORT RAIL FOR A LUGGAGE CARRIER

[75] Inventor: Craig Stapleton, Port Huron, Mich.

[73] Assignee: Huron/St. Clair Company, a division of Masco Industries, Inc., Port Huron, Mich.

[21] Appl. No.: 909,707

[22] Filed: Sep. 22, 1986

[51] Int. Cl.$^4$ .............................................. B60R 9/00
[52] U.S. Cl. ................... 224/321; 224/325; 224/326
[58] Field of Search ............. 224/321, 325, 326, 319, 224/316, 322, 315, 323, 324, 309

[56] References Cited

U.S. PATENT DOCUMENTS

| Re. 26,539 | 3/1969 | Bott | 224/321 |
|---|---|---|---|
| 3,719,313 | 3/1973 | Tischler | 224/309 |
| 4,323,182 | 4/1982 | Bott | 224/321 |
| 4,432,478 | 2/1984 | Bott | 224/321 |
| 4,440,333 | 4/1984 | Bott | 224/324 |
| 4,448,337 | 5/1984 | Cronce | 224/321 |
| 4,469,261 | 9/1984 | Stapleton et al. | 224/321 |
| 4,487,348 | 12/1984 | Mareydt | 224/321 |
| 4,500,020 | 2/1985 | Rasor | 224/321 |
| 4,588,117 | 5/1986 | Bott | 224/321 |

Primary Examiner—Henry J. Recla
Assistant Examiner—David Voorhees
Attorney, Agent, or Firm—Edgar A. Zarins; Leon E. Redman; Malcolm L. Sutherland

[57] ABSTRACT

An adjustable support rail for a luggage carrier adapted to be mounted on an exterior surface of a vehicle. The system includes a pair of spaced parallel tracks fixedly secured to the exterior surface of the vehicle and having a slot extending substantially the length of the track. A support stanchion is slidably mounted to each of the tracks with a rail extending between the stanchions. The stanchion includes a tensioning member which lockingly engages the stanchion onto the track once it is properly positioned by clampingly engaging the track against the stanchion. The stanchion may be selectively locked and released using a threaded member which engages and draws the tensioning member towards a wall of the stanchion and against the track. In addition, the end of the track is closed off by an end cap which includes a pivotable door covering an access opening through which the stanchion is mounted to the track. In order to reduce or eliminate wind resistance, both the leading edge of the stanchion and the end cap are gradually tapered.

24 Claims, 6 Drawing Sheets

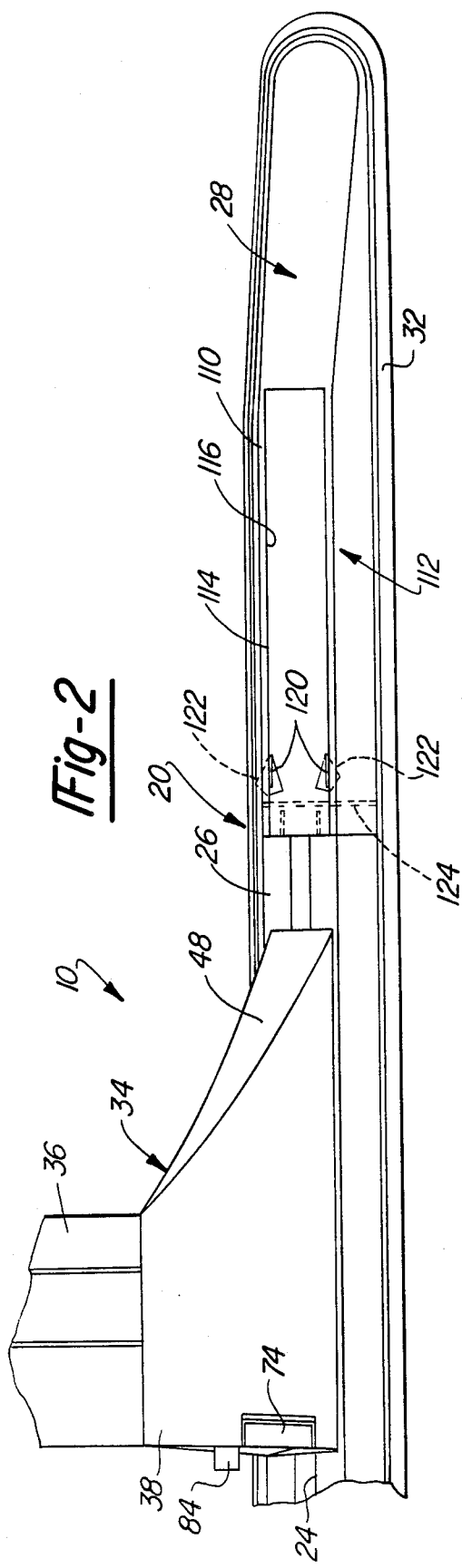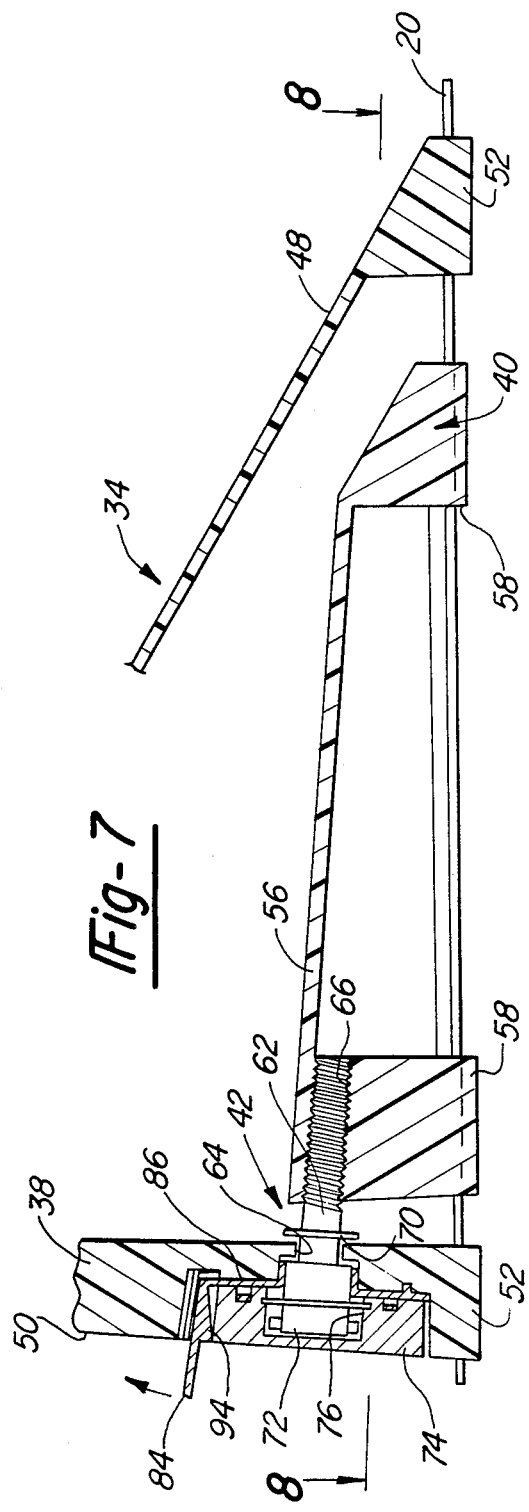

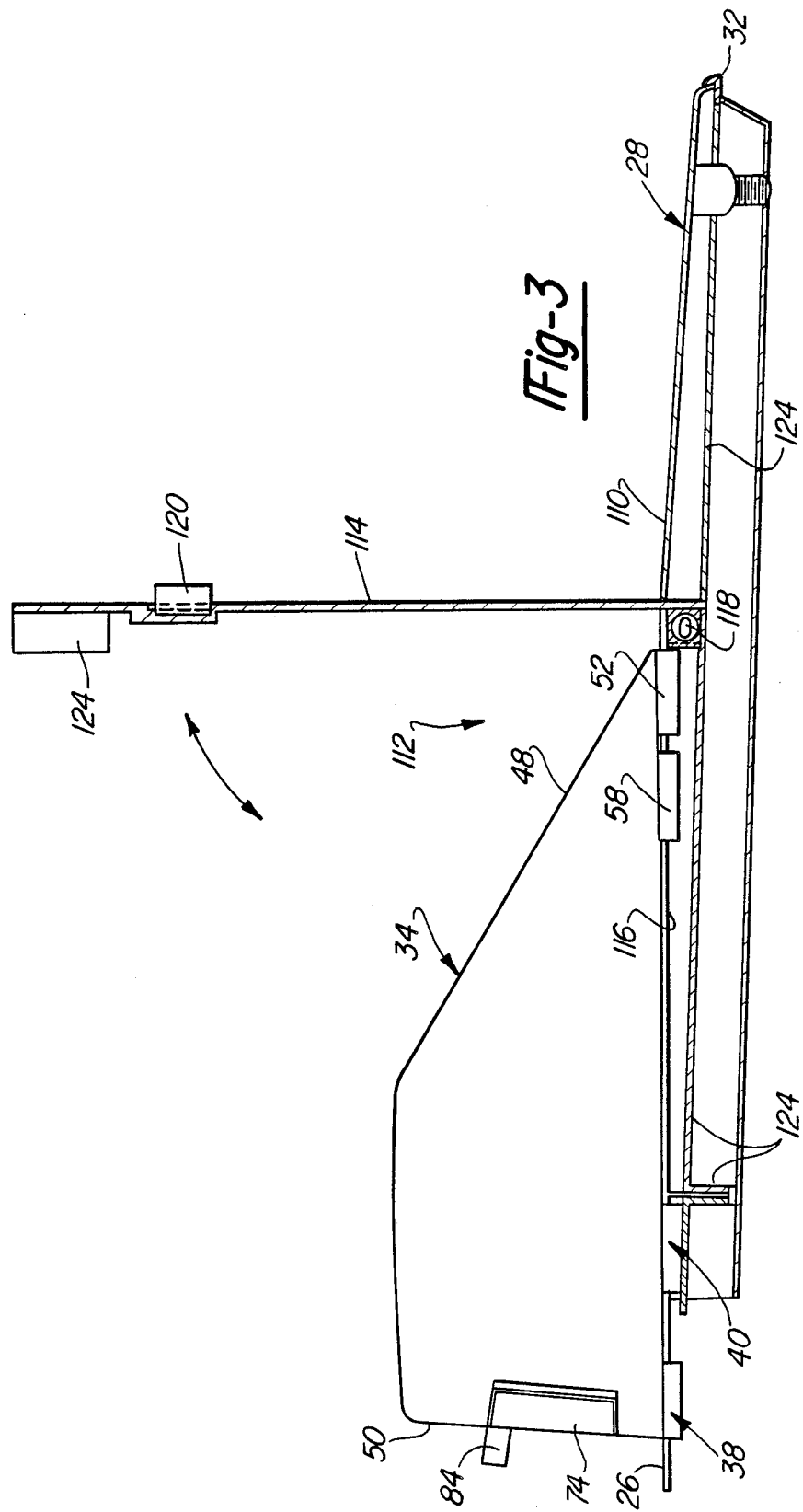

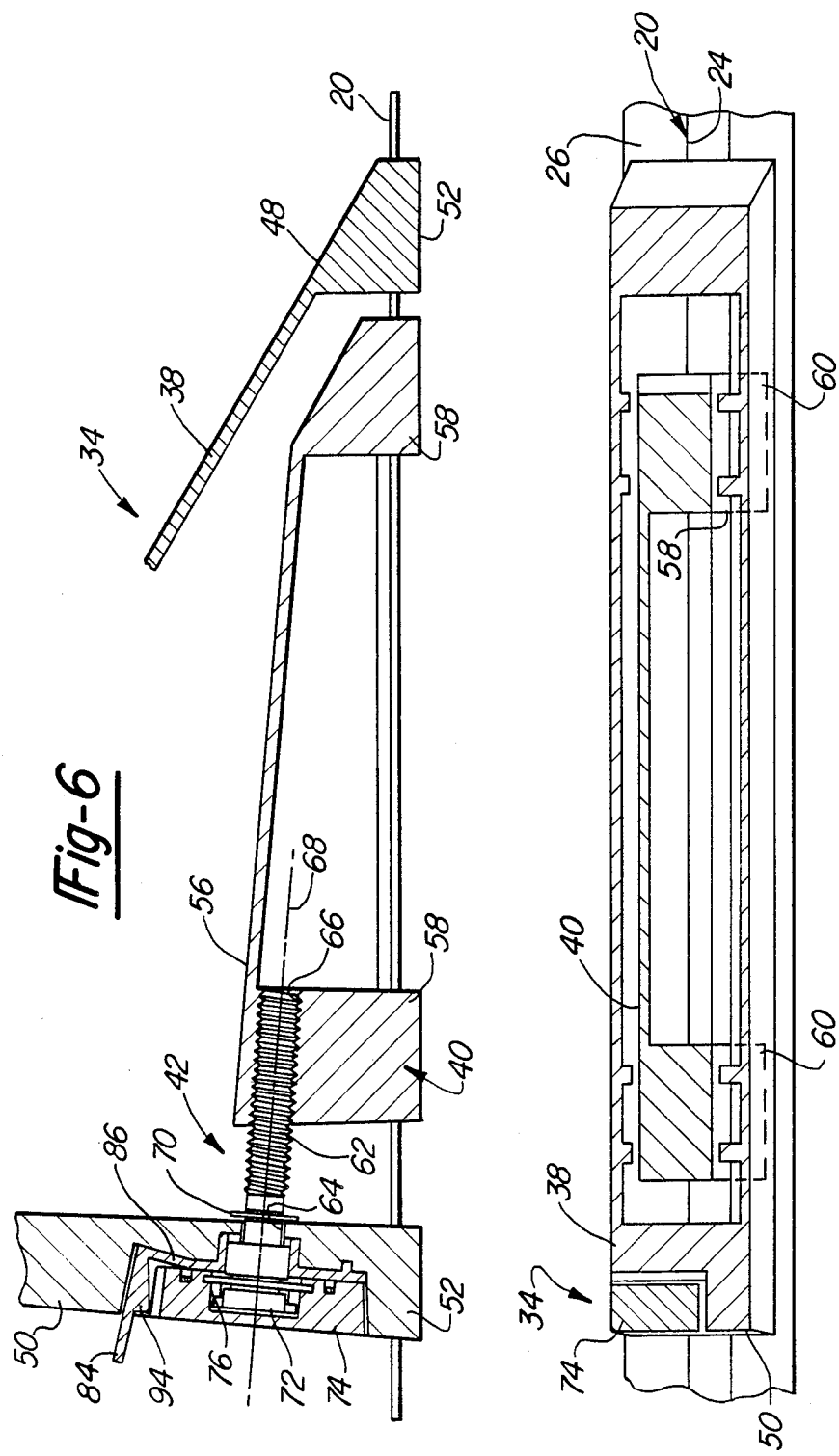

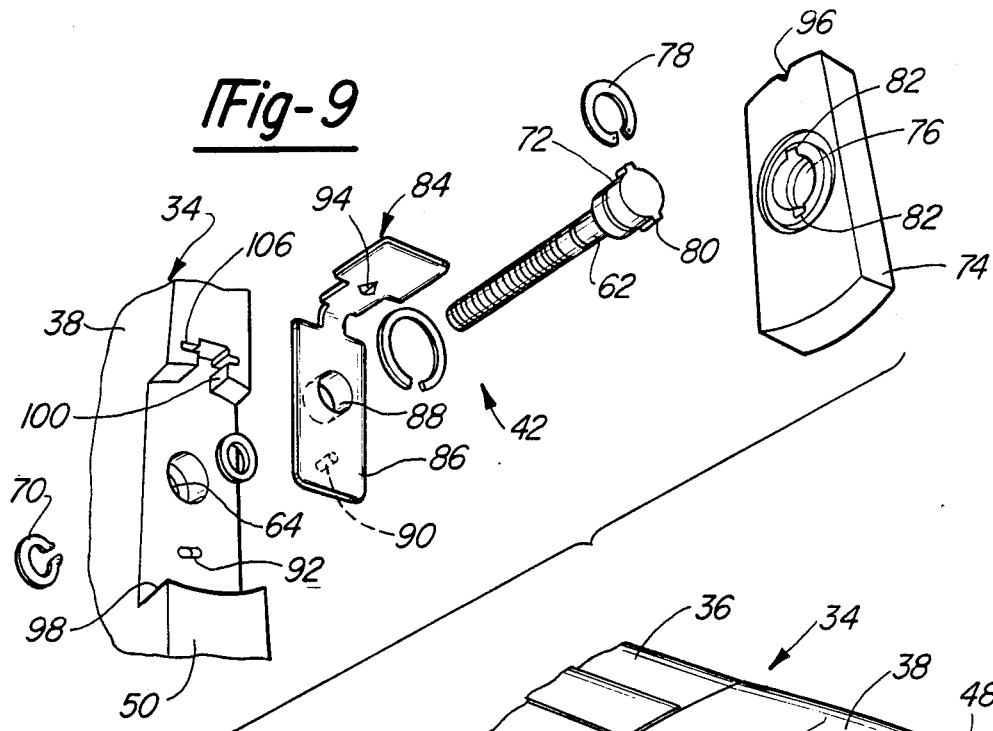
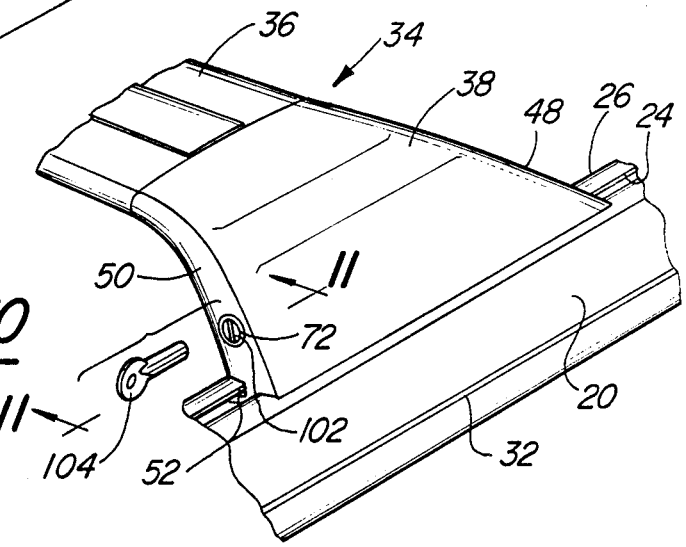
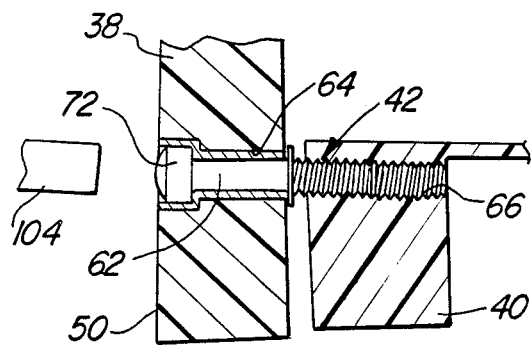

ADJUSTABLE SUPPORT RAIL FOR A LUGGAGE CARRIER

BACKGROUND OF THE INVENTION

I. Field of the Invention

This invention relates to support rail assemblies for luggage carriers and, in particular, to a support rail which may be adjusted along longitudinally extending rails or removed altogether according to the user's specific requirements.

II. Description of the Prior Art

Elevated support rails have been widely utilized to constrain luggage or the like transported on roof mounted luggage carriers. Generally, these support rails are utilized in conjunction with a load-bearing surface formed by a series of parallel slats mounted flush with the surface of the vehicle. Thus, the luggage is placed upon the load-bearing slats and may be tied down to the support rails which also prevent the luggage from sliding off of the carrier due to changes in momentum. In order to improve the aerodynamic properties of the vehicle, both the peripheral frame and the load-bearing slats are designed to minimize wind resistance.

However, because the frame is permanently fixed to the vehicle surface by a plurality of stanchions, these elevated rails add unnecessary wind resistance during periods of non-use despite their aerodynamic properties. In order to alleviate this problem, removable stanchions were developed which connect to sockets formed in the vehicle rooftop. Generally, these stanchions are spring-biased within the sockets to prevent inadvertent removal of the stanchions. Removal of the elevated frame is accomplished by first disassembling the rails from the stanchions and thereafter individually removing the stanchions. Upon removal of the frame, the load-bearing slats and the stanchion sockets remain.

Despite the provision of a removable frame for luggage carriers, these frames are limited by the placement of the stanchion sockets. Thus, smaller luggage loads or odd-sized packages are not readily accommodated by the past known luggage racks since changes in momentum would have a tendency to shift the baggage until a frame member is reached. Moreover, these conventional luggage carriers are not readily accommodated to different vehicle makes and sizes.

SUMMARY OF THE PRESENT INVENTION

The present invention overcomes the disadvantages of the prior art by providing a support rail which is capable of being longitudinally adjusted or removed altogether depending upon the user's specific requirements.

The support assembly according to the present invention includes a pair of spaced parallel track housings which extend longitudinally along an exterior surface of the vehicle and which adjustably receive support stanchions having an elevated rail extending therebetween. The track housings each define a channel with a channel slot extending substantially the length of the tracks. The support stanchions, which are lockingly secured to the track housings, include an outer shell and an inner tensioning membr which are adjustably connected to selectively lock and unlock the stanchion from the track. The locking mechanism may be manually operated or require a special key. The tensioning member of the stanchion includes at least one flanged portion which extends into the channel slot and beneath the upper wall of the track housing. Thus, upon locking of the stanchion the flanged portion of the tensioning member is drawn upwardly until the track housing wall is clampingly engaged.

The track housings include at least one removable end cap allowing the user to remove the stanchions as necessary. The end caps include an access slot with a width greater than the width of the channel slot in order to remove the flanged portion of the stanchion from within the channel. Each of these access slots is covered by a pivotable acess door which is disposed within the access slot during normal use.

Thus, the present invention allows for slidable adjustment of a support rail along a longitudinal track fixedly secured to the vehicle surface. In the alternative, the support rail and stanchions may be removed during periods of non-use.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 2 is an elevated perspective of the support stanchion and track housing of the present invention;

FIG. 3 is a side view of the support stanchion and track housing of the present invention shown with the access door in the open position;

FIG. 6 is a partial cross-sectional perspective of the present invention taken along line 6—6 of FIG. 5 with the tensioning mechanism in its disengaged position;

FIG. 7 is a partial cross-sectional perspective of the present invention with the tensioning mechanism in the clampingly engaged position;

FIG. 8 is a cross-sectional view of the present invention taken along line 8—8 of FIG. 5;

FIG. 9 is an exploded perspective of the adjusting means of the present invention;

FIG. 10 is an elevated perspective of an alternative embodiment of the present invention; and FIG. 11 is a partial cross-sectional perspective of the locking mechanism of the alternative embodiment of the present invention taken along line 11—11 of FIG. 10.

DETAILED DESCRIPTION OF A PREFERRED EMBODIMENT OF THE PRESENT INVENTION

Figure 1:
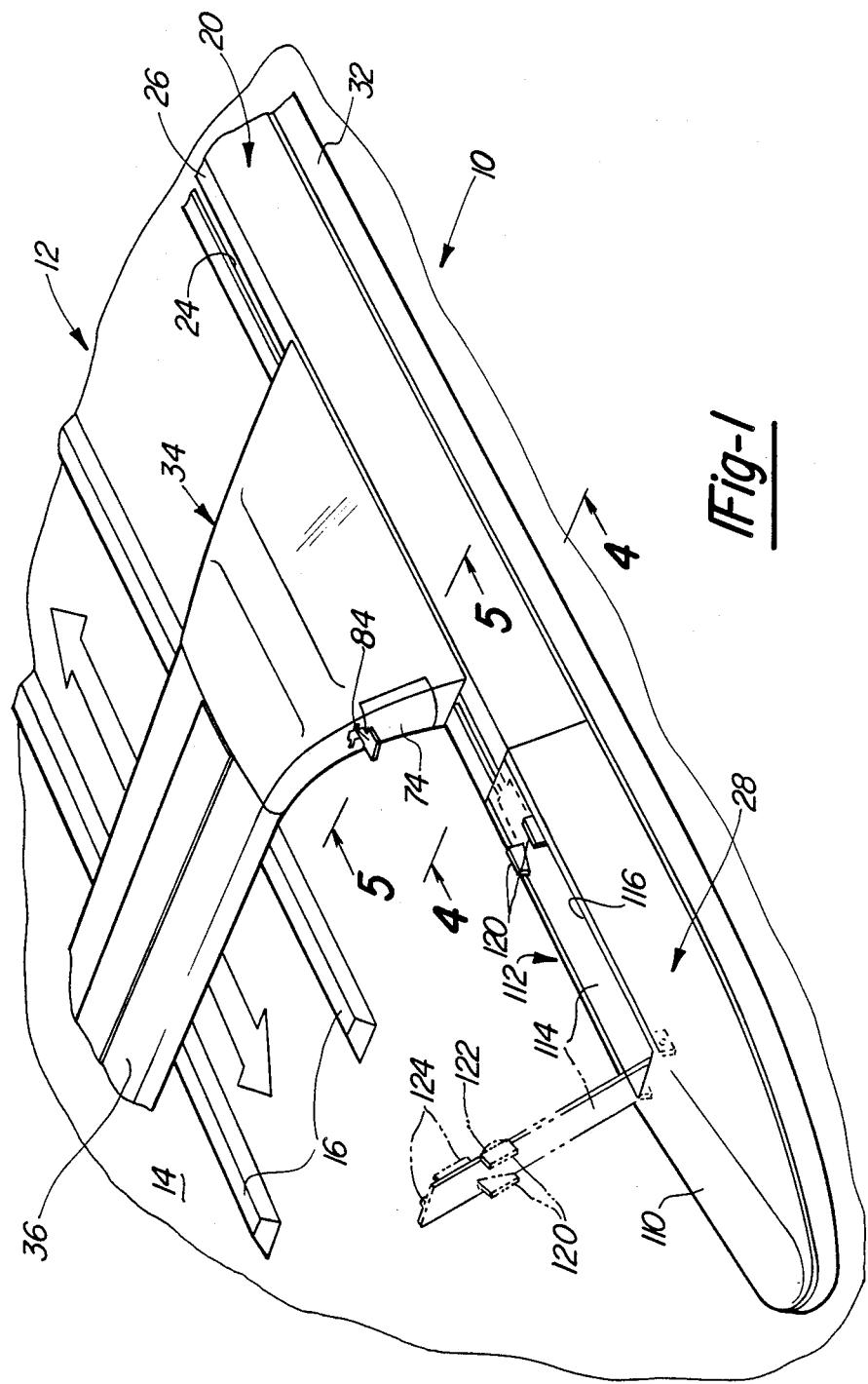
FIG. 1 is an elevated perspective of the support assembly of the present invention secured to the vehicle surface.

Referring first to FIGS. 1 and 2, there is shown an adjustable support assembly 10 embodying the present invention and forming a luggage carrier 12 adapted to be mounted to an exterior surface 14 of a motor vehicle or the like. The luggage carrier 12 of the present invention preferably includes a plurality of load-bearing slats 16 mounted flush to the vehicle surface 14 upon which the cargo is placed and the elevated support frame 10, which constrains the lateral and longitudinal movement of the luggage placed in the carrier 12. It is to be understood that the luggage carrier 12 of the present invention may be provided with any number of the support frame assemblies 10 although only one portion of the support assembly 10 is shown for clearness of understanding.

Figure 4:
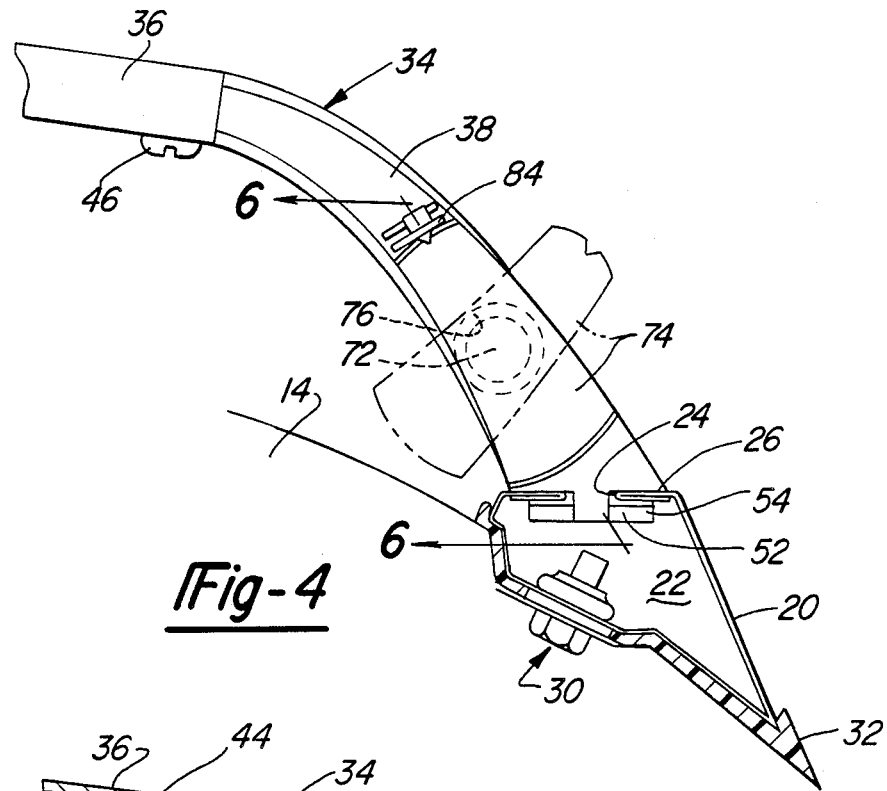
FIG. 4 is an end view of the support stanchion with the track housing shown in cross-section taken along line 4—4 of FIG. 1.

The support assembly 10 of the present invention generally comprises a pair of spaced parallel track housings 20 (only one shown) which are fixedly secured to the vehicle surface 14. Each track housing 20 defines an elongated interior channel 22 and includes a channel slot 24 formed through the top wall 26 of the track housing 20. This channel slot 24 extends substantially the length of the track housing 20 and provides an opening between the interior channel 22 and the exterior of the track 20. The track housings 20 preferably have a modular construction and include one or more end caps 28 secured to one or both ends of the elongated track housing 20. These end caps 28 have a similar cross-sectional configuration as the track 20 although they gradually taper down towards the vehicle surface 14 in order to minimize wind resistance. The sloped configuration of the end caps 28 allows the wind to flow over the track housing 20. As with the track 20, the end cap 28 defines an interior channel 22. However, no slot is formed in the top wall 26 but rather means for accessing the interior channel 22 are provided as will be subsequently described in greater detail. Both the track 20 and end cap 28 are fixedly secured to the vehicle surface 14 by a mounting bolt 30 (FIG. 4). Disposed between the track 20 and the vehicle surface 14 is an insulator seal 32 which prevents the elements from penetrating the vehicle body.

Referring still to FIGS. 1 and 2, each track housing 20 has at least one support stanchion 34 adjustably mounted to the top surface 26 of the track 20. These support stanchions 34 are disposed in pairs on the track 20 such that a cross rail 36 can be fixedly secured therebetween. The rail 36 is secured at its ends to the adjustable stanchions 34 mounted on each track 20. Additional pairs of stanchions 34 and a cross rail 36 may be provided thereby forming a forward and a rearward support rail. As will be subsequently described, each of the stanchions 34, and therefore the rail 36, may be adjustably moved along the track 20 and lockingly secured into any desired position, or removed from the track housing 20 and the vehicle roof 14 altogether.

Figure 5:
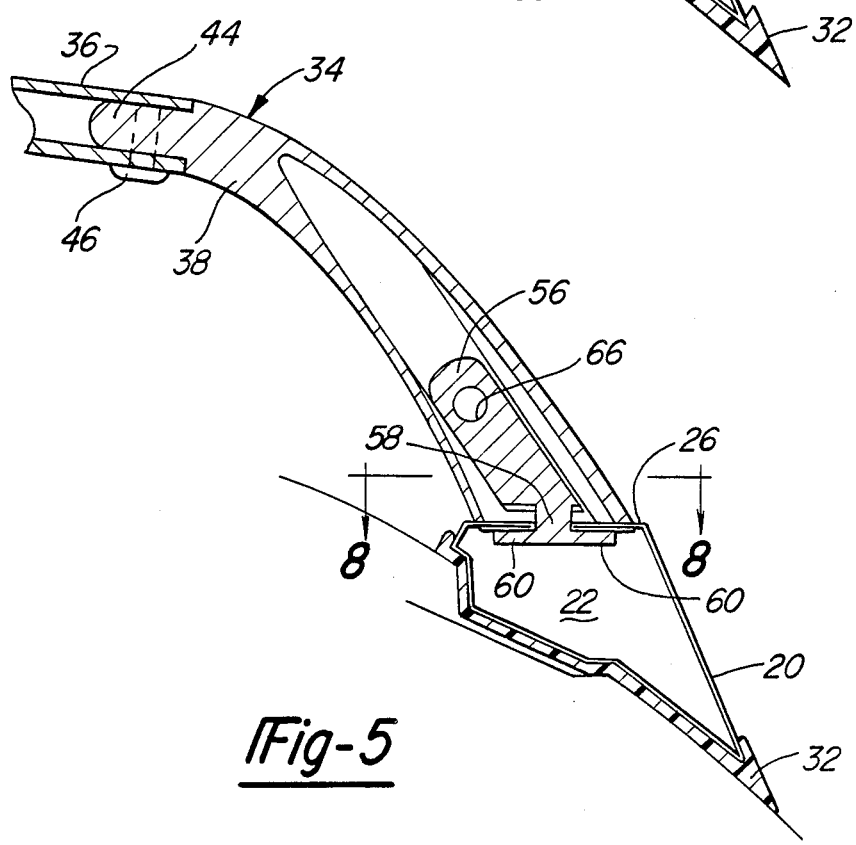
FIG. 5 is a cross-sectional view of the present invention taken along line 5—5 of FIG. 1.

Referring generally to FIGS. 4 through 8, the support stanchion 34 includes an outer support shell 38, which forms the outer configuration of the stanchion 34, and an inner tensioning member 40 disposed within the shell 38. The inner tensioning member 40 is independently movable relative to the support shell 38 and means 42 for adjustably connecting the tensioning member 40 to the shell 38 extends between each component as shown in FIGS. 6 and 7. The outer support shell 38 generally curves inwardly and preferably includes an inward extension 44 at the upper end thereof to facilitate attachment of the cross rail 36. As shown in FIG. 5, the extension 44 is received by the hollow end of the rail 36 and is secured thereto by the screw 46. Furthermore, the shell 38 has an overall configuration which minimizes wind resistance by employing a gradually sloped forward surface 48 and a substantially vertical rearward surface 50.

The outer shell 38 generally rides on the top surface 26 of the track housing 20 and is supported thereby. However, the shell 38 includes downwardly extending flanges 52 which extend into the channel 22 through the slot 24 of the track 20. These flanges 52 have a substantially T-shaped cross-sectional configuration and include outwardly extending portions 54 which extend beneath the wall 26. Thus, the wall 26 is disposed between the shell 38 and the flanges 52 thereby preventing vertical removal of the shell 38 from the channel slot 24 and the track housing. However, sufficient space is provided between the flange 52 and the shell 38 such that movement of the stanchion 34 along the track 20 is readily accomplished.

Referring now to FIGS. 5 and 6, the inner tensioning member 40 has a configuration substantially similar to the shell 38 with the upper portion 56 of the tensioning member 40 slanting inwardly. The tensioning member 40 also includes downwardly extending flanges 58 which extend through the slot 24 in the top wall 26 and into the channel 22 of the track housing 20. These flanges 58 have a substantially T-shaped cross-sectional shape with outwardly extending portions 60 which extend beneath the wall 26. In this fashion, the wall 26 is disposed between the upper portion 56 of the tensioning member 40 and the outwardly extending portions 60 of the flange 58 such that these flanges 58 may act upon the wall 26 to clampingly engage the wall as will be subsequently described. Despite this engagement, sufficient space is provided between the flanges 58 and the portion 56 of the tensioning member 40 to allow freedom of movement of the stanchion 34 along the track 20.

The outer support shell 34 and the tensioning member 40 are adjustably connected by means 42 shown in exploded view in FIG. 9. The primary component of the connecting means 42 is a threaded member or bolt 62 which extends between the shell 34 and the tensioning member 40 of the stanchion 34. Both the shell 34 and the tensioning member 40 are provided with throughbores 64 and 66, respectively. However, the throughbore 66 extending through the wall of the tensioning member 40 is threaded to provide threaded engagement with the member 62. Accordingly, as the member 62 is rotated, the tensioning member 40 will be caused to travel along the axis 68 formed by the threaded member 62. The direction of travel will be determined by the direction of rotation of the threaded member 62. In contrast, the member 62 will be allowed to freely rotate within the throughbore 64 formed in the wall 50 of the shell 34. However, the position of the threaded member 62 is maintained by a C-ring 70 secured to the member 62 interiorly of the wall 50 of the support shell 38. This C-ring 70 prevents the threaded member 62 from backing out of the throughbore 64 as the member 62 is rotated, thereby ensuring proper operation.

Two alternative embodiments of the connecting means 42 are shown in FIG. 9 and FIGS. 10-11. Each of these embodiments operates under similar principles with only the means for rotating the threaded member 62 varying. In the preferred embodiment shown in FIGS. 6, 7 and 9, the head 72 of the threaded member 62 is attached to a manually rotatable handle 74. As shown in FIG. 9, the head 72 is received within an opening 76 formed in the handle 74 and secured therein by a C-ring or lock washer 78. In order to ensure mutual rotation of the handle 74 and the threaded member 62, the head 72 is provided with outwardly extending lugs 80 which cooperate with notches 82 formed in the handle 74. Once assembled, the handle 74 forms a portion of the wall 50 to eliminate wind resistance, yet is rotatable relative thereto. Thus, the handle 74 forms a portion of the wall 50 in its normal position shown in FIGS. 1 and 4 yet can be rotated from this position to effectuate rotation of the threaded member 62 as shown in phantom in FIG. 4.

In order to prevent rotation of the handle 74 while in the normal, aligned position, a locking tab 84 is provided which lockingly engages the top portion of the handle 74. The locking tab 84 includes a main body 86 formed at a right angle to the manually engageable tab 84 and includes a sleeve 88 which receives the threaded member 62. This sleeve 88 extends, at least partially, through the bore 64 formed in the wall 50 of thesupport shell 38. A pin 90 extending from the body 86 of the locking tab 84 cooperates with notch 92 to prevent rotation of the locking tab 84 during rotation of the handle 74. The locking tab 84 is provided with a downwardly extending triangular wedge 94 which disengagingly cooperates with a similarly shaped notch 96 formed in the top wall of the handle 74. Once in position, the handle 74 can only be rotated upon disengagement of the wedge 94 by lifting the tab 84 as will be subsequently described.

Assembly of the preferred embodiment of the conecting means 42 is easily accomplished in order to provide flush alignment of the handle 74 with the wall 50 of the stanchion 34. Once the head 72 of the threaded member 62 is secured to the handle 74 using the C-ring 78, the threaded member 62 is fed through the sleeve 88 of the locking tab 84 and through the bore 64 in the wall 50 of the stanchion 34. Thereafter, the C-ring 70 is secured to the threaded member 62 to prevent removal thereof. In the fully assembled position, handle 74 fits into the removed portion 98 of the wall 50 yet is freely rotatable. In addition, the locking tab 84 extends through the slot 100 and outwardly from the wall 50 and the handle 74 as shown in FIGS. 1 and 2. In this position, the locking tab 84 can be manually grasped in order to disengage the wedge 94 from the notch 96 to permit rotation of the handle 74.

In the alternative embodiment shown in FIGS. 10 and 11, a key arrangement replaces the handle 74. The head 72 of the threaded member 62 is provided with a transverse slot 102. In order to rotate the threaded member 62, a key 104 with a substantially hollow end cooperates with the head 72 of the threaded member 62. Of course, any type of key arrangement may be utilized to rotate the threaded member 62 without departing from the spirit of the present invention. The key arrangement is advantageous in that rotation of the threaded member 62 cannot be efectuated without the key 104 which can be stored separately from the support assembly 10. This can prevent unauthorized removal of the stanchions 34 from the track housing 20.

Both embodiments of the present invention operate under identical principles in order to facilitate adjustment or removal of the support stanchions 34 and cross rail 36. The support stanchion 34 is mounted to the track housing 20 such that the upper wall 26 extends through the slots formed by the T-shaped flanges of both the outer shell 38 and the tensioning member 34. In this position, the stanchion 34 canot be removed except by sliding the stanchion 34 past the end of the channel slot 24 as will be subsequently described. Once proper positioning of the stanchions 34 is attained, the stanchion 34 can be lockingly secured to the track housing 20 by rotating the threaded member 62. As the threaded member 62 is rotated clockwise, the threaded engagement between the member 62 and the throughbore 66 causes the tensioning member 40 to be drawn towards the wall 50 of the support shell 38. However, because the axis of travel 68 is not parallel to the track 20, the tensioning member 20 is displaced upwardly at an angle to the horizontal. Thus, as rotation of the threaded member 62 is continued, the tensioning member 40 will travel from its disengaged position shown in FIG. 6 to a lockingly engaged position shown in FIGS. 7 and 11. This sloped displacement of the tensioning member 40 also causes upper wall 26 of the track housing 20 to be clampingly engaged between the flanges 58 of the tensioning member and the outer support shell 38. Thus, as threaded member 62 is rotated, the clamping tension exerted by the tensioning member 40 will be increased until the stanchion 34 is prevented from moving along the track 20.

Referring now to FIGS. 1 through 3, in order to facilitate insertion of the stanchion 34, particularly the flanges 52 and 58, into the track housing 20, an end cap 28 is secured to one or both ends of the track housing 20. This end cap 28 has a configuration substantially similar to the cross-sectional configuration of the track 20 but includes a tapered end wherein the top surface 110 of the end cap 28 slopes towards the surface 14 of the vehicle. Formed in the top surface 110 of the end cap 28 is an access means 112 comprising an access slot 114 and an access door 16. The access door 116 is pivotably attached to the end cap 28 by a pivot pin 118 mounted across the channel 22, and can be selectively pivoted from an open positon shown in phantom in FIG. 1 to a closed position wherein the door 116 covers the access slot 114. The access door 16 is provided with a pair of locking tabs 120 which prevent the door 116 from inadvertently opening. The tabs 120 include outwardly extending portions 122 which extend beneath the top surface 110 of the end cap 28 to prevent the access door 116 from inadvertently opening. The tabs 120 include outwardly extending portions 122 which extend beneath the top surface 110 of the end cap 28 to prevent the access door 116 from pivoting upwardly. In order to disengage the locking tabs 120 to open the access means 112, the tabs 120 are squeezed inwardly thereby sliding the extensions 122 from beneath the surface 110. Moreover, the tabs 120 are resiliently biased such that the tabs 120 are forced outwardly towards their locking position. Furthermore, the end cap 28 and access door 16 include numerous strengthening webs 124 which provide additional structural strength to the end cap 28.

As is best shown in FIG. 3, insertion or removal of the stanchion 34 within the track housing 20 is facilitated by the end cap 28 and its access means 112. The access slot 114 has a width greater than the width of the channel slot 24 and wide enough such that the outwardly extending or "T"-portions 54 and 60 of the flanges 52 and 58, respectively, may be placed within the channel 22. With the flanges extending into the channel 22 of the track housing 20, the stanchion 34 is moved longitudinally until the neck of each of the flanges 52 and 58 extends through the slot 24. In this position, the stanchion 34 will rest on the top surface 26 of the track housing 20 and can be positioned as desired.

Once the placement of the stanchion 34 is established, the threaded member 62 is rotated, using either the handle 74 or the key 104, until the track 20 is clampingly engaged by the tensioning member 40 of the stanchion 34. When sufficient tension has been applied, the handle 74 is aligned with the wall 50 of the stanchion 34 and the locking tab 84 is moved into engagement with the handle 74 by removing it from the transverse slot 106 and letting it move downwardly along the vertical slot 100. With the stanchion 34 properly positioned along the track 20, the access slot 114 can be closed by pivoting the door 116 downwardly and engaging the locking tabs 120.

Thus, the present invention provides a support rail assembly 10 which provides simple adjustment or removal of the stanchions 34 and the rail 36 according to the user's specific requirements.

The foregoing detailed description has been given for clearness of understanding only and no unnecessary limitations should be understood therefrom as some modifications will be obvious to those skilled in the art without departing from the scope and spirit of the appended claims.

I claim:

1. An adjustable support assembly for a luggage carrier adapted to be mounted on an exterior surface of a vehicle, said support assembly comprising:
   at least two spaced parallel elongated track housings fixedly secured to the exterior surface of said vehicle, each of said track housings defining a channel and having an elongated channel slot formed in a wall of said housing and extending substantially the length of said housing;
   at least one support stanchion adjustably mounted to each said trackhousings, said support stanchion comprising an outer support shell having an underside supported on said wall of said trackhousing and an end wall, an inner tensioning member disposed within said support shell and having an integral clamping flange, said flange depending downwardly from said tensioning member through said channel slot into said channel of said track housing, and means for adjustably connecting said tensioning member relative to said support shell, said connecting means extending through said end wall of said support shell to engage said tensioning member within said shell; and
   a rail extending transversely between a pair of said support stanchions and fixedly secured thereto so as to be supported above said vehicle surface;
   said means for adjustably connecting said inner tensioning member to said support shell includes a threaded member extending substantially horizontally through said end wall of said outer support and threadably engaging said inner tensioning member housed within said support shell, said tensioning member movable within said support shell relative to said end wall along the axis of said threaded member upon rotation of said threaded member to lockingly secure said support stanchion to said track housing wherein said integral flange of said tensioning member clampingly engages said wall of said track housing between said flange of said tensioning member and said underside of said outer support shell.

2. The support assembly as defined in claim 1 wherein said channel slot is formed in an upper, substantially horizontal wall of said track housing.

3. The support assembly as defined in claim 2 wherein said support stanchion is mounted to said upper wall of said track housing.

4. The support assembly as defined in claim 3 wherein said threaded member includes a handle exterior of said support shell for manually rotating said threaded member, said handle forming at least a portion of an exterior surface of said wall of said support shell.

5. The support assembly as defined in claim 3 wherein said threaded member includes a slotted head exterior of said support shell, said slotted head adapted to receive key means for rotating said threaded member.

6. The support assembly as defined in claim 3 wherein said downwardly depending flange of said tensioning member includes a neck portion which extends into said channel through said channel slot.

7. The support assembly as defined in claim 6 wherein said flange includes outwardly extending portions and wherein said channel slot has outer edges defining a slot width greater than said neck portion of said flange, said outwardly extending portions extending beyond the outer edges of said slot beneath said upper wall of said track housing.

8. The support assembly as defined in claim 7 wherein said flange cooperates with said upper wall of said track housing for clampingly engaging said support stanchion against said track housing.

9. The support assembly as defined in claim 4 and further comprising a locking tab attached to said handle of said threaded member for lockingly securing said handle to prevent rotation thereof, said locking tab engaging a notch formed in said handle.

10. The support assembly as defined in claim 7 wherein said track housings further comprise end caps attachable to at least one end of each said track housing.

11. The support assembly as defined in claim 10 wherein said end caps include access means for mounting said support stanchion to said track housing such that said flange of said tensioning member extends into said channel through said channel slot.

12. The support assembly as defined in claim 11 wherein said access means includes an access slot having a width greater than the width of said channel slot to allow said outwardly extending portions of said flange to extend into said channel and an access door movable to selectively open and close said access slot.

13. The support assembly as defined in claim 12 wherein said access door is pivotally connected to said end cap.

14. The support assembly as defined in claim 12 wherein said access door includes means for locking said door in its closed position.

15. An adjustable support assembly for a luggage carrier adapted to be mounted on an exterior surface of a vehicle, said support assembly comprising:
   a pair of spaced parallel elongated track housings fixedly secured to the exterior surface of said vehicle, each of said track housings defining a channel having a elongated channel slot formed in an upper wall of said housings substantially the length of said housings wherein said housings have one closed end and one open end;
   at least one support stanchion adjustably mounted to each of said track housings, said support stanchion comprising an outer support shell having an underside supported on said upper wall of said track housing, an inner tensioning member having a downwardly depending integral flange extending through said channel slot into said channel of said track housing, said tensioning member disposed within said support shell, and means for adjustably connecting said tensioning member to said support shell, said connecting means extending laterally through an end wall of said support shell to engage said tensioning member movably housed within said shell wherein said tensioning member is movable along said connecting means relative to said support shell upon rotation of said connecting means thereby selectively lockingly securing said support stanchion to said track housing such that said integral flange of said tensioning member selectively clampingly engages said upper wall of said track housing against said underside of said outer support shell;

an end cap attached to the open end of said track housing, said end cap including an access slot adapted to be selectively opened and closed for mounting said support stanchion to said track housing; and a rail fixedly secured at the opposite ends thereof to said support stanchions mounted to each of said track housings.

16. The support assembly as defined in claim 15 wherein said means for adjustably connecting includes a threaded member extending through a wall of said outer shell and threadably engaging said inner tensioning member, said tensioning member movable relative to said wall of said support shell upon rotation of said threaded member.

17. The support assembly as defined in claim 15 wherein said access means includes door means for selectively opening and closing said access means.

18. An article carrier for mounting on a surface of a motor vehicle, said article carrier comprising:

at least one track housing fixedly secured to the vehicle surface;

a support stanchion slidably secured to said track housing, said stanchion comprising an outer shell having an underside supported on said track housing, an inner tensioning member movably disposed within said outer shell and having an integral clamping flange extending into said track housing, and a rotatable threaded member extending laterally through a side wall of said outer shell and threadably engaging said tensioning member wherein as said threaded member is rotated in a first direction said tensioning member is drawn upwardly and laterally along the axis of said threaded member towards said side wall of said outer shell to urge said integral clamping flange against said track housing thereby clamping a portion of said track housing between said clamping flange of said tensioning member and said underside of said outer shell to fixedly secure said stanchion to said track housing; and a rail fastened to said stanchion such as to be supported above the vehicle surface.

19. The article carrier as defined in claim 18 and further comprising end cap means having selectively openable access slot secured to one end of said track housing, said end cap means facilitating mounting of said stanchion to said track housing such that said integral clamping flange extends into said track housing.

20. The support assembly as defined in claim 19 wherein said means for adjustably connecting said tensioning member to said support shell includes a threaded member extending through a side wall of said outer support shell and threadably engaging said inner tensioning member, said tensioning member movable relative to said side wall of said support shell upon rotation of said threaded member.

21. The support assembly as defined in claim 20 wherein said integral flange of said tensioning member includes a neck portion which extends into said channel through said channel slot and outwardly extending portions, said outwardly extending portions extending beyond the edges of said channel slot beneath said upper wall of said track housing to prevent removal of said flange through said channel slot.

22. An adjustable support assembly for a luggage carrier adapted to be mounted on an exterior surface of a vehicle, said support assembly comprising:

at least two spaced parallel track housings fixedly secured to the exterior surface of said vehicle, each of said track housings defining a channel and having a channel slot formed in a upper wall of said housing and extending substantially the length of said housing;

at least one support stanchion adjustably mounted to each said track housing, said support stanchion comprising an outer support shell supported on said track housing, an inner tensioning member housed within said support shell and having an integral flange extending through said channel slot into said track housing, and means for adjustably connecting said tensioning member to said support shell;

means for lockingly securing each said support stanchion to said track housing wherein said integral flange of said tensioning member clampingly engages said wall of said track housing between said flange of said tensioning member and said outer support shell;

an end cap attached to at least one end of said track housing, said end cap including selective access means for mounting aid support stanchion to said track housing, said access means comprising an access slot having a width greater than the width of said channel slot to allow said integral flange of said tensioning member to be placed within said track housing and an access door movable to selectively open and close said access slot; and a rail extending transversely between a pair of said support stanchions and fixedly secured thereto so as to be supported above said vehicle surface.

23. The support assembly as defined in claim 22 wherein said access door is pivotally connected to said end cap.

24. The support assembly as defined in claim 23 wherein said access door includes means for locking said door in its closed position.

* * * * *